No. 859,600.
PATENTED JULY 9, 1907.
S. A. ELLIS.
MOWING MACHINE.
APPLICATION FILED FEB. 3, 1906.
2 SHEETS—SHEET 2.
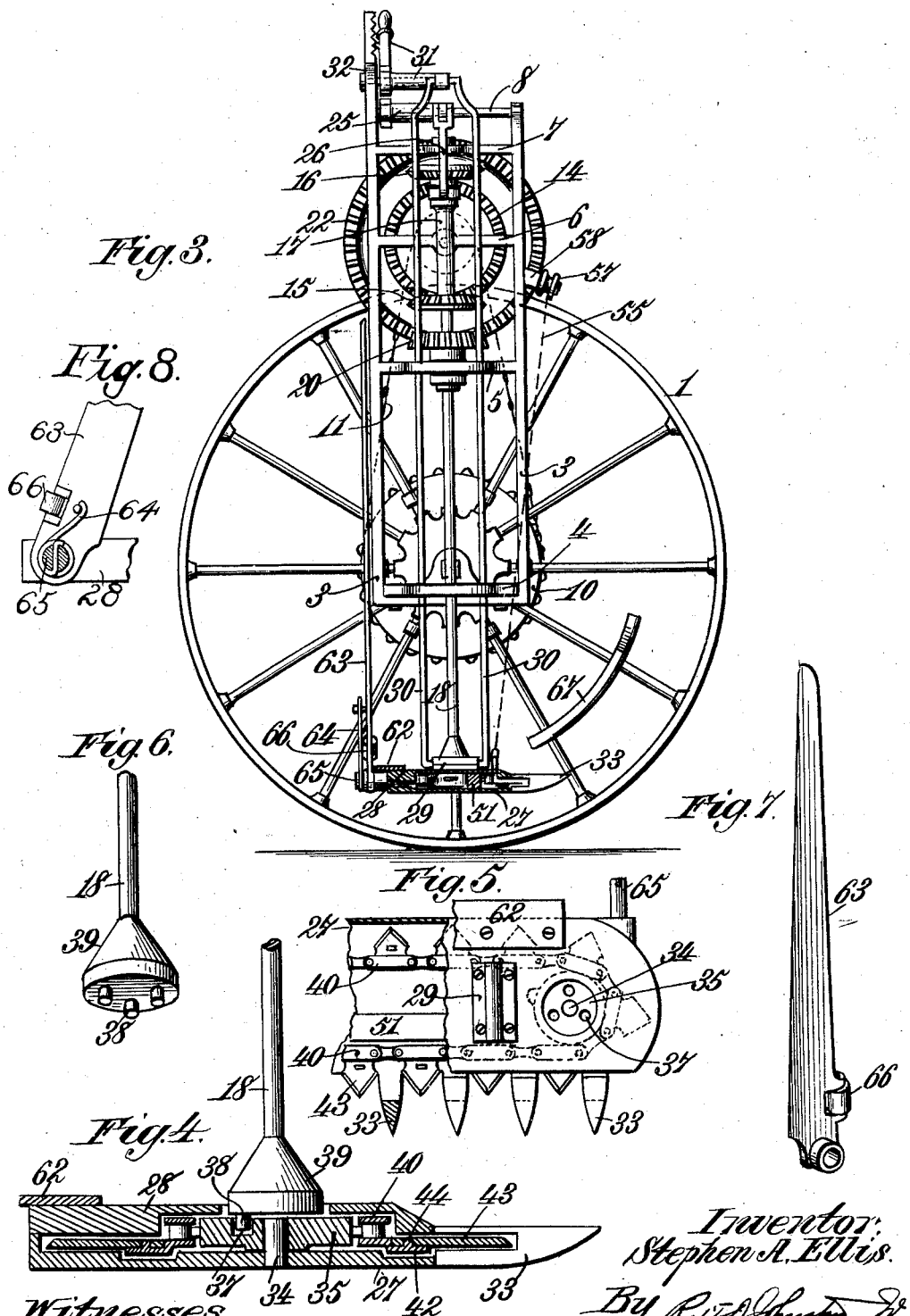
Witnesses.
Inventor:
Stephen A. Ellis.

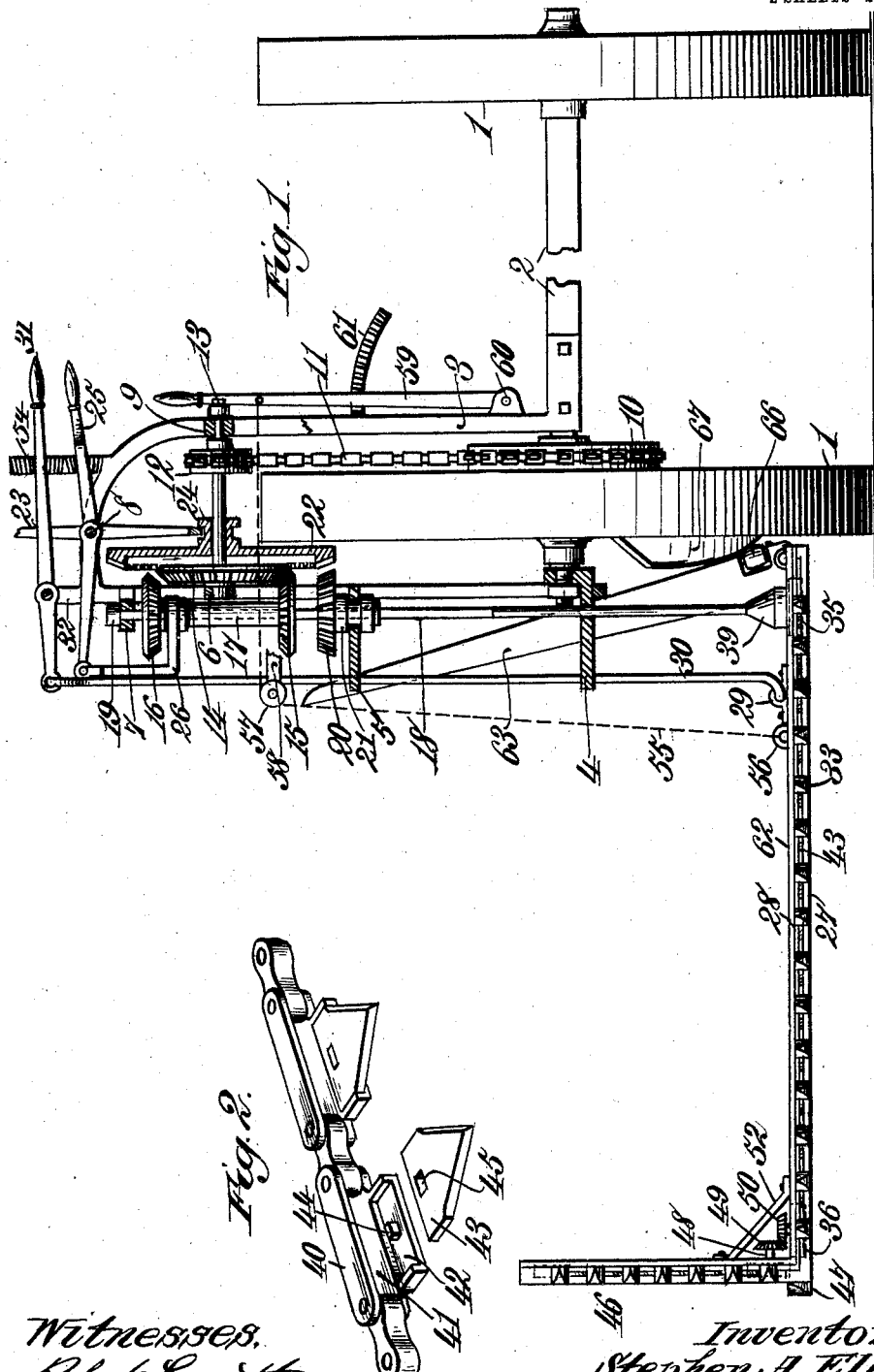

UNITED STATES PATENT OFFICE.

STEPHEN A. ELLIS, OF WOODLAWN, ALABAMA, ASSIGNOR OF ONE-FOURTH TO ELISHA JAMES ROBINSON, OF EAST LAKE, ALABAMA.

MOWING-MACHINE.

No. 859,600.  Specification of Letters Patent.  Patented July 9, 1907.

Application filed February 3, 1906. Serial No. 299,328.

*To all whom it may concern:*

Be it known that I, STEPHEN A. ELLIS, a citizen of the United States, residing at Woodlawn, in the county of Jefferson and State of Alabama, have invented new and useful Improvements in Mowing-Machines, of which the following is a specification.

My invention relates to improvements for mowing machines provided with a horizontal sickle comprising an endless chain driven by sprocket wheels at each end of the finger bar and provided with reversible cutter blades.

It is one object of my invention to provide, as an attachment at the outer end of the horizontal sickle casing, a vertically disposed finger bar and an endless cutter chain coöperating therewith and driven from the outer sprocket wheel of the main cutter chain.

It is a further object of my invention to provide a transversely disposed hinged cutter blade adapted to be actuated by a cam on the wheel and by engagement with a sharpened edge of the horizontal sickle case to cut the grass and long vines transversely into blocks or short lengths.

It is a further object of my invention to provide an adjustable support for the horizontal sickle casing pivoted thereto at a point near its inner end and to provide a driving connection for the inner sprocket wheel which engages the latter after the fashion of a clutch and in such a manner as to be disconnected therefrom when the sickle is swung upwardly on its pivotal supports to a vertical position and to automatically reengage the sprocket wheel when the sickle is dropped to horizontal position.

My invention further comprises improvements in the mechanism for producing fast and slow driving speeds for the sickle chain and in the details of construction of the frame work for supporting the cutting and driving mechanism so that the same may be readily adjusted and controlled by levers in easy reach of the driver.

As illustrating the preferred embodiment of my invention, reference is made to the accompanying drawings, in which:—

Figure 1, is a front view of a mowing machine provided with my improvements. Fig. 2, is a detail view of a section of the sickle chain. Fig. 3, is a side elevation of the machine showing the horizontal sickle casing in cross section. Fig. 4, is an enlarged view of the horizontal sickle taken on a cross section through the inner sprocket wheel. Fig. 5, is an enlarged plan view partly broken away of the inner end of the horizontal sickle casing. Fig. 6, is a detail view of the driving clutch for the sickle chain. Fig. 7, is a detail view of the transverse cutter knife. Fig. 8, is a reverse view of the cutter knife showing a spring which holds it open.

Similar reference numerals refer to similar parts throughout the drawings.

The mower comprises wheels 1 mounted upon an axle 2 and may be provided with draft apparatus and devices for seating the driver of any suitable description, the same being not shown in the drawings. Bolted to the axle 2 near one of the wheels are two bent irons 3 constituting the main frame work which supports the driving and controlling mechanism for the cutting apparatus. These bars pass over the wheel and are bent downwardly to engage and pass under a brace plate 4 bolted to the outer end of the shaft 2 beyond the wheel. The bars are securely bolted to this brace plate, as seen in Fig. 3, and are braced at intervals by cross-bars 5, 6, 7, 8 and 9, which may be formed integral therewith or bolted thereto as is desired. A sprocket wheel 10 is connected to the inner side of said wheel and by a chain 11 drives a sprocket wheel 12 fixed on a shaft 13 journaled on the cross-bars 6 and 9. This shaft carries at its outer end a beveled gear 14 adapted to mesh with one or the other of two beveled gears 15 and 16 carried by a sleeve 17. This sleeve and the gears have squared openings therethrough through which the upper squared end of the driving shaft 18 for the sickle mechanism passes, this shaft being provided at its upper end with a collar 19 disposed above the cross-bar 7 and adapted to limit the downward movement of the driving shaft. This shaft passes through suitable openings in the plate 4 and the cross-bars 5 and 7, which serve as bearings therefor. A third beveled gear 20, also provided with a squared central opening through which the shaft 18 passes, has a sleeve 21 by means of which it is journaled in the cross-bar 5 and held, by integral collars above and below the bar, against vertical movement. A large beveled gear 22 splined on the shaft 13 is adapted to mesh with the gear 20 when moved outwardly by means of a lever 23 journaled on the cross-bar 8 and connected at its inner end to a sleeve 24 fixed to the gear 22. To adjust the gears 15 and 16 so that one or the other will mesh with the gear 14, or both ride free of this gear when the gears 20 and 22 are in mesh, I provide a lever 25, also journaled on the cross-bar 8, and pivotally connected to an angle bar 26, which at its inner end encircles the sleeve 17 between shoulders thereon. This arrangement permits the sleeve 17 and its gears to rotate freely and to be vertically adjusted by the angle bar 26 when the lever 25 is operated. This driving mechanism will act to drive the shaft 18 forward at two speeds or to reverse the shaft at the low speed.

The sickle mechanism adapted to be driven by the shaft 18 comprises a wide sickle bar 27 and a top 28 which are suitably bolted together and constitute the sickle casing. Near the inner end of this casing I provide a clip 29 suitably bolted to the top and provided with a transverse circular opening adapted to receive the rounded ends of supporting bars 30. These bars are formed of a bent metal rod, as shown in Fig. 3, which is connected at its upper end to a lever 31 fulcrumed on a standard 32 formed integral with or connected to one of the bars 3 and projecting above the same. The supporting bars 30 pass through guide openings in the plate 4 and the cross-bar 5 and are bent at right angles toward each other at their inner ends so that they enter in the opening in the clip 29 in a manner to furnish a hinge support for the sickle casing. This sickle casing is provided with fingers 33 integral with the finger bar which constitutes the lower half of the casing. Mounted on vertical axes 34 disposed at the inner and outer ends of the sickle are two sprocket wheels 35 and 36. The sprocket 35 near the inner end of the casing is provided with three countersunk openings 37 in its upper face which are adapted to receive lugs or pins 38, which depend from the underface of the clutch head 39 of the driving shaft 18. The pins and openings make a loose fit so that as the shaft 18 is turned the pins will readily catch in the openings and thus form a positive clutch connection between the shaft and sprocket wheel. An endless chain passes around these sprocket wheels and is driven thereby, the chain comprising links 40, as shown in detail in Fig. 2, the lower link plate 41 of each link having an integral socket plate 42 adapted to receive the inner ends of the sickle blades 43. Preferably the socket plate is recessed to form a rectangular seat for the squared inner end of a blade, so that the latter when seated in the socket is held securely against any except a vertical and an outward movement. A square stud 44 in the socket engages in an opening 45 in each blade and holds the latter against outward displacement, the top 28 of the casing, as seen in Fig. 4, serving to hold the blades against any vertical movement which would permit their disengagement from the sockets. The cutting portion of the blade is preferably triangular shape and sharpened on both edges so that the sickle chain will cut when moved in either direction.

At the outer end of the horizontal sickle casing I provide an attachment comprising a vertically disposed finger bar 46, bolted or otherwise secured to the shoe 47. An endless sickle chain similar to that described for the horizontal sickle co-operates with this vertical finger bar. The lower sprocket wheel for that is connected to the shaft 48 of a beveled gear 49 adapted to mesh with the beveled gear 50 connected to and rotatable with the outer sprocket wheel 36 of the horizontal sickle. I provide an abutment 51 in each casing which holds the sickle chains outwardly to their work. The vertical sickle is rigidly connected to the outer end of the top 28 by angle braces 52, and if desired the shoe 47 may be provided with angle irons to brace the vertical sickle against its work.

To enable the cutting mechanism to be vertically adjusted, I provide a rack 54 with which lever 31 engages, the bars 30 holding the sickle at any desired elevation. To swing the sickle mechanism up on its pivotal hinge 29, I provide a chain 55 connected to an eye bolt 56 on the casing and passing over a guide roller 57 connected to a support 58 on one of the bars 3. This chain is connected to a vertically disposed lever 59 pivoted to a stud 60 on one of the bars 3 and adapted to engage with a rack segment 61, by means of which it may be held at any desired adjustment. When it is desired to swing the cutter frame upwardly in this manner, the lever 31 is first depressed to lift the horizontal sickle casing so that as it is swung upwardly by the movement of lever 59, its inner end will not strike the earth. It will be seen that the sprocket 35 will readily disengage itself from the clutch head 39 on the driving shaft 18, and it will be evident that, as soon as the lever 59 permits the cutting mechanism to resume its horizontal position, the sprocket 35 will move under the clutch head of the driving shaft and as the latter is rotated, the pins 38 will drop into the recesses in the sprocket and lock the parts in operative engagement.

Where it is desired to cut long vines or stubble into transverse lengths, I provide the rear side of the top 28 with a knife edge 62 and at the inner and rear edge of the top 28, I pivotally connect an elongated cutter blade 63 normally held in the position shown in Fig. 1, by means of a spring 64 fixed on the journal stud 65 for the knife. This knife is provided with a roller 66 so disposed as to be engaged by a cam plate 67 fixed to the spokes on one of the wheels. As the wheel rotates, this cam plate strikes the roller 66 and without much friction forces the cutter blade 63 downwardly so that by co-operating with the knife edge 62, it serves to cut the vines or stubble in transverse lengths. One or more of the cam plates 67 may be used on a wheel if desired. The vertical sickle and cutter blade 63 may both be readily attached when the work requires them. Also it will be noted that, by supporting the main sickle directly from the axle it follows with the wheel irregularities of the ground. By the hand levers the sickle may be given any desired adjustment or speed or direction of movement.

The details of construction may be modified or equivalent devices substituted without departing from the spirit of my invention.

Having thus described my invention, what I claim as new and desire to secure by Letters Patent, is:—

1. In a mowing machine, a finger bar, an adjustable support to which said bar is hinged near its inner end, a sprocket wheel mounted to rotate in a horizontal position at the inner end of said finger bar, an endless sickle chain driven by said wheel, means to adjust said bar vertically and to swing it towards a vertical position, and a driving mechanism which operatively engages said wheel when the finger bar is in a horizontal position and is disengaged therefrom as the bar is swung upwardly on its hinge support.

2. In a mowing machine, a finger bar, sprocket wheels rotatably mounted thereon at each end, an endless sickle chain which passes around said wheels and co-operates with said finger bar, a vertically adjustable driving shaft, a clutch to engage the inner sprocket wheel, an adjustable support hinged to said bar, and means to swing said sickle bar on its hinged support to lift its outer end towards a vertical position and move said inner sprocket wheel out of engagement with said shaft.

3. In a mowing machine, an axle, wheels, a supporting frame connected to said axle on both sides of a wheel, a counter shaft driven from said axle and journaled in said frame, two gear wheels, one of which is adjustable on said shaft, a drive shaft journaled in said frame, a sickle operated by said drive shaft, a sleeve connected to said drive shaft and provided with reversing gears adapted to mesh with one of the gears on said counter shaft, means to adjust said sleeve longitudinally on said shaft for the purposes described, a second gear journaled in said frame and adapted to mesh with the other of said gears on the counter shaft, and means to move said latter gears into engagement, substantially as described.

4. In a mowing machine, a sickle comprising an endless sickle chain, a drive sprocket for said chain, a drive shaft for said sprocket, a frame, connected to the machine, in which said shaft is journaled, a counter shaft driven by the machine, and two-speed and reversing gear driving mechanisms between said shafts, hand controlled levers for changing the speed or direction of movement of said sickle chain, hand-controlled levers for adjusting said sickle both vertically and angularly and cutter blades carried by said chain and adapted to cut when moved in either direction.

5. In a mowing machine, a sickle comprising a finger bar, an endless sickle chain co-operating therewith, sprockets for said chain the inner one of which is provided with sockets, socket members carried by the links of said chain and provided with studs, cutter blades having ends which fit in said sockets and are held thereby against lateral displacement, openings in said blades to receive said studs, and means to hold said blades in engagement with said studs, in combination with a driving shaft disposed at right angles to the inner of said sprockets and provided with clutch studs adapted to enter the sockets in said sprocket, substantially as described.

6. In a mowing machine, in combination with a horizontal sickle and a casing therefor, of a cutting edge disposed longitudinally of said casing, a pivoted cutter blade adapted to co-operate with said edge in cutting longitudinally of said sickle, and an actuator driven by the mowing machine and adapted to intermittently operate said cutter blade.

7. In a mowing machine, a horizontal sickle, a knife edge carried by said sickle, a cutter blade pivotally mounted and adapted to swing longitudinally of said sickle and co-operate with said knife edge, a wheel of the machine, a cam carried thereby and adapted to engage and intermittently operate said blade, and spring means to return said blade to its initial position.

8. In a mowing machine, a horizontal sickle comprising an endless sickle chain, a finger bar, sprocket wheels at each end of said bar and around which said chain passes, means to adjust said sickle, a power shaft, and clutch connections to one of said sprockets to drive said chain, in combination with a vertical sickle attachment comprising a finger bar supported at the outer end of said horizontal sickle, sprocket wheels mounted thereon, an endless sickle chain driven by said sprocket wheels, and gear connections to drive one of said latter sprocket wheels from the sprocket wheel at the outer end of said horizontal finger bar.

In testimony whereof I have hereunto set my hand in presence of two subscribing witnesses.

STEPHEN A. ELLIS.

Witnesses:
THOS. J. WINGFIELD,
ROBT. D. JOHNSTON, Jr.